Dec. 2, 1941.  H. M. SCHMITT  2,264,956
MEANS FOR MEASURING AND UTILIZING SMALL DIRECT CURRENTS
Filed Nov. 21, 1934  2 Sheets-Sheet 1

INVENTOR.
HENRY M. SCHMITT
BY John E Hubbell
ATTORNEY

INVENTOR.
HENRY M. SCHMITT
BY John E. Hubbell
ATTORNEY

Patented Dec. 2, 1941

2,264,956

UNITED STATES PATENT OFFICE 2,264,956

MEANS FOR MEASURING AND UTILIZING SMALL DIRECT CURRENTS

Henry Martin Schmitt, Philadelphia, Pa., assignor to The Brown Instrument Company, Philadelphia, Pa., a corporation of Pennsylvania Application November 21, 1934, Serial No. 754,185

33 Claims. (Cl. 236—74)

The general object of the present invention is to provide improved means for measuring and/or utilizing for control and analogous purposes, minute direct currents such as those resulting from the voltage variations of the thermo-couples in measuring temperatures, or from photovoltaic cells.

One object of the present invention is to provide novel and effective means for converting a small direct current into an alternating current which may be readily amplified for measurement and other purposes. In the preferred mode of attaining this object of the invention, I utilize the source of small direct current electromotive force to create a pulsating current by conecting said source in circuit with a resistance formed by a selenium cell or other device, varying in electrical resistance with the amount of light transmitted to it, and transmit light to said device from a source of light varying in intensity with suitable regularity and frequency, and advantageously consisting of a neon glow lamp energized by alternating current of commercial frequency. The pulsating current thus created is converted by suitable inductive resistance, or other apparatus such as an ordinary transformer into alternating current which may be amplified by the use of one of various known forms of amplifiers such as the thermionic tube amplifiers commonly employed in radio circuits.

The production of alternating current from a direct current source of electromotive force in the manner described is characterized by the simplicity and effectiveness of the apparatus required and particularly by the fact that it does not include movable mechanism parts such as are required by certain methods heretofore proposed for converting small direct currents into pulsating or alternating currents for amplification purposes. The conversion of direct current into alternating current in the manner and for the purpose described is desirable also, because it permits of the avoidance of undesirable phase distortion and because the desirably simple and symmetrical form which the alternating current waves may have. A further advantage of this method is that the apparatus for converting minimizes or eliminates stray potentials that would themselves set up undesired alternating currents. The selenium cell can be made essentially symmetrical eliminating stray contact potentials or other sources of E. M. F.

. A further object of the invention is to effect a novel and desirable combination of means for converting direct current into and amplifying alternating current with potentiometric measuring means to thereby produce a novel and relatively simple form of self-balancing potentiometer instrument which may follow the approved practices of the art in respect to many of its features, and may be produced, for example, by the elimination or replacement of a relatively small portion only of the parts of a potentiometer instrument of desirable commercial form.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Figure 1:
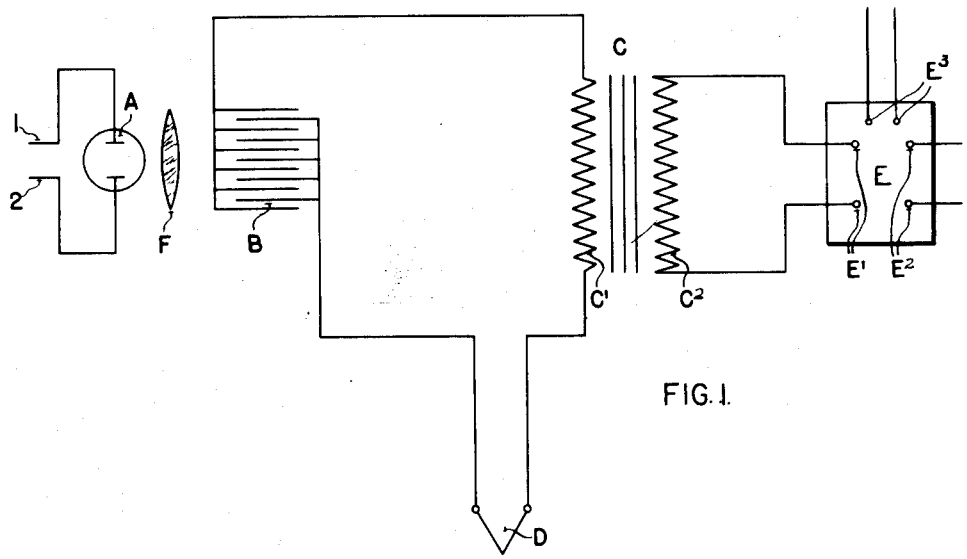
Fig. 1 is a diagrammatic representation of current converting and amplifying means.

In Fig. 1, A represents a variable source of light advantageously in the form of a neon lamp having its terminals connected by conductors to a source of alternating current which may be of commercial frequency, so that the lamp emits light varying in intensity as the current supplied by the conductors 1 and 2 alternately varies in direction and magnitude. An electrical resistance B varying with the intensity of light to which it is subjected, and which may be a selenium or other photoelectrical cell, receives light from the lamp A. The electrode terminals of the device B are connected in series with the primary winding $C^1$ of a transformer C and a thermo-couple D or other source of direct current electromotive force of small intensity. The secondary winding $C^2$ of the transformer C is connected to the input terminals $E^1$ of an alternating current amplifying device E having output terminals $E^2$ and power current terminals $E^3$. The amplifying device E may be of any usual or suitable form and in particular may be such an amplifying device including one or more thermionic tubes as is commonly employed in radio circuits and for analogous purposes to deliver alternating current at its output terminals $E^2$ suitably related to, but of greater magnitude than the alternating current supplied to its input terminals $E^1$. As shown a suitably converging lens F is interposed between the lamp A and the light sensitive resistance B.

As those skilled in the art will recognize, the arrangement shown in Fig. 1 is characterized by its simplicity and effectiveness, and in particular by the avoidance of mechanism including movable parts heretofore proposed for use in converting small direct currents into alternating currents for current amplification purposes. As those skilled in the art will recognize, the characteristics and proportions of the parts of the apparatus shown in Fig. 1 may readily be made such that the alternating currents delivered to the input terminals $E^1$ and delivered from the output terminals $E^2$ of the amplifier E may be suitable simple and symmetrical in wave form and desirably free from phase distortion or displacement relative to the phase of the current supplied to the terminals of the lamp A by the supply conductors 1 and 2.

Figure 2:
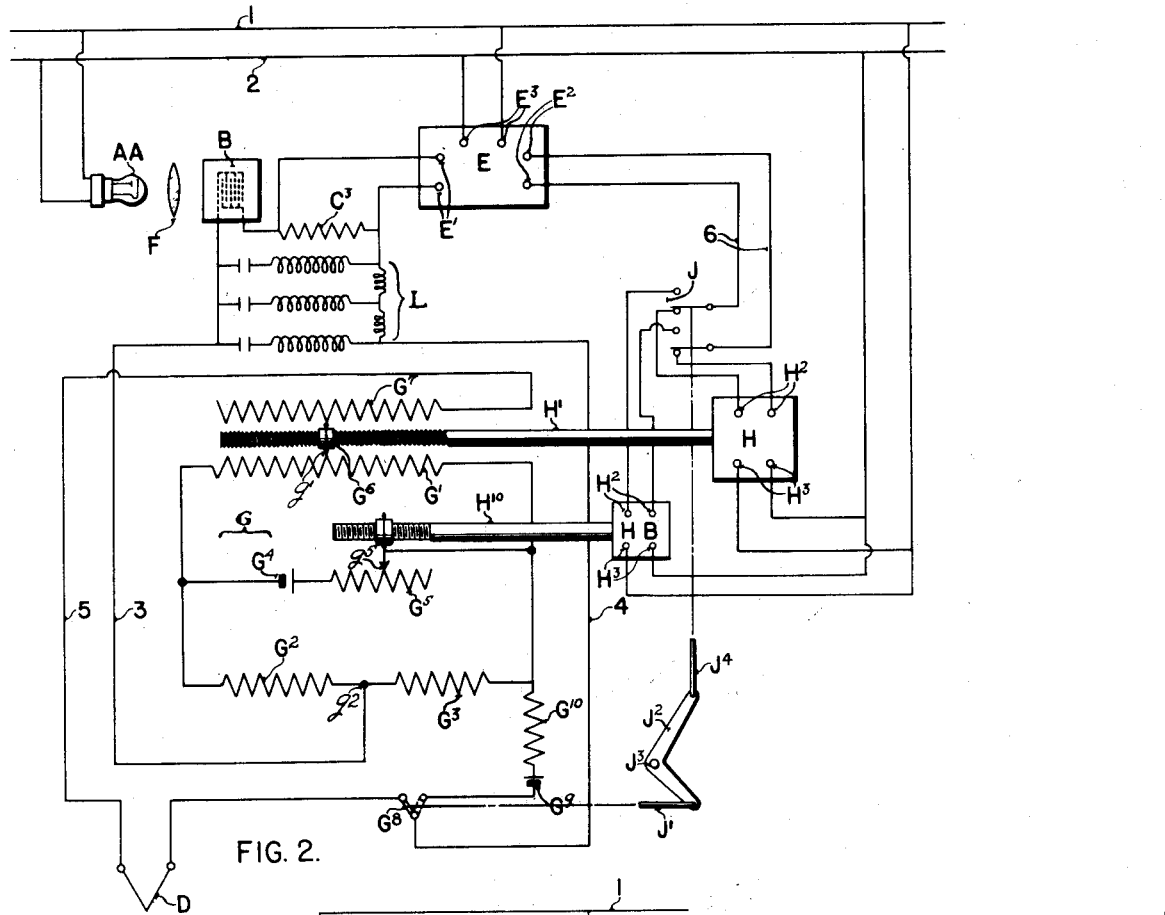
Fig. 2 is a diagrammatic representation of potentiometric measuring apparatus including current converting and amplifying means.

While the input terminals $E^1$ of the amplifier E are conveniently energized through the transformer C, other provisions, such as those shown in Fig. 2, may be made for the energization of said terminals by the pulsating current flow in the circuit which includes the light sensitive resistance B and is energized by the thermo-couple D or other source of a small uni-directional electromotive force.

The parts A, B, C, E and F, associated generally as shown in Fig. 1, may be combined with other apparatus in the manner shown in Fig. 2. In the arrangement actually shown in Fig. 2, however, the light source A of Fig. 1 is replaced by a light source AA of different form, and the transformer C of Fig. 1 is replaced by a resistor $C^3$ which in the circuit including the light sensitive resistance B, replaces the transformer primary $C^1$ of Fig. 1, and which has its terminals connected to the amplifier terminals $E'$. It is to be noted, however, that for the general purposes of the arrangement of Fig. 2, the resistor $C^3$ is the equivalent of the transformer C of Fig. 1, and the same general results would be obtained if the resistor $C^3$ of Fig. 2 were replaced by the primary $C^1$ of the transformer C and the secondary $C^2$ of the latter were connected to the amplifier terminals $E^1$ as in Fig. 1.

The light source AA of Fig. 2 may be a neon tube but it differs from the tube A of Fig. 1 in that one electrode thereof is shielded from light sensitive device B. The electrodes of the Fig. 1 light source A are disposed side by side so that light from first one and then the other impinges on cell B. In Fig. 2, however, one electrode is in the form of a relatively small plate and the other electrode is in the form of a larger disc disposed between the plate electrode and device B so that the larger disc electrode completely shields the smaller plate electrode from light sensitive device B and the latter will thereby be responsive to source A during only one half of each cycle. The purpose of thus shielding one electrode of source AA is to permit selective operation of a reversible motor as hereinafter described when the light source is energized from the same source as field I of motor H or from a source having the same frequency as the source for field I.

In Fig. 2 the light sensitive resistance B, the thermo-couple D, and the resistor $C^3$ are included in a circuit branch connected between the points $g^1$ and $g^2$ of potentiometer circuit G, of a potentiometer measuring instrument, which includes provisions for automatically adjusting the circuit connections in a direction and to an extent tending to maintain a potential difference between the points $g^1$ and $g^2$ equal and opposite to the E. M. F. of the thermo-couple D.

The potentiometer circuit G shown in Fig. 2 is of the split potentiometer type and comprises three branches connected in parallel, one branch including the main potentiometer slide wire resistor $G^1$, a second branch including balancing resistances $G^2$ and $G^3$, and the third branch including a battery $G^4$ or other source of current and a resistance $G^5$ which may be adjusted as required to insure a current flow of the desired magnitude through the resistor $G^1$. A sliding contact $G^6$ engages the resistor $G^1$ at the point $g^1$, the position of which along the length of the resistor $G^1$ is varied by the sliding adjustment of the contact $G^6$. The latter as shown is a bridging contact connecting the point $g^1$ of the resistor $G^1$ to a corresponding point of a slide wire resistor $G^7$ alongside the resistor $G^1$.

The resistor $G^7$ has one end connected by a conductor 5 to one terminal of the thermo-couple D, and is employed for the known purpose of avoiding measurement inaccuracies due to variations in resistance to the flow of current generated by the thermo-couple D which would otherwise result from variations in the relative resistances of the portions of the resistor $G^1$ at opposite sides of the point $g^1$. The second terminal of the thermo-couple D is normally connected through a switch $G^8$ and conductor 4 to one terminal of the cell B. The other terminal of the cell B is connected by a conductor 3 to the branch of the potentiometer G including the resistances $G^2$ and $G^3$ at the point in said branch intermediate said resistances.

With the arrangement shown in Fig. 2, the flow, and direction of flow, of current through the circuit branch including the conductor 3, light sensitive resistance B, resistance $C^3$, conductor 4, switch $G^8$, thermo-couple D, conductor 5, portion of the resistance $G^7$ at the right of the bridging contact $G^6$ and the latter, depends upon the relation between the voltage of the thermo-couple D and the potential difference between the points $g^1$ and $g^2$. The thermo-couple D is so connected to the potentiometer circuit that the electromotive force of the thermo-couple opposes the potential difference between the points $g^1$ and $g^2$. The potential difference between the points $g^1$ and $g^2$ is increased and decreased by movement of the contact $G^6$ to the right and to the left, respectively. With a suitable adjustment of the contact $G^6$, the potential difference between the points $g^1$ and $g^2$ will be equal and opposite to the electromotive force of the thermocouple D and no current will flow through the above mentioned current branch including the thermo-couple D and resistance $C^3$. On an increase in the thermo-couple voltage above the potential difference between the points $g^1$ and $g^2$, current will flow in one direction through the resistance $C^3$ and such current flow may then be eliminated by a suitable adjustment of the bridging contact $G^6$ to the right. Conversely when the voltage of the thermo-couple falls below the potential difference between the points $g^1$ and $g^2$, the resultant current flow through the resistance $C^3$ will be in such direction that it may be eliminated by a suitable adjustment of the contact $G^6$ to the left.

As diagrammatically illustrated, the bridging contact $G^6$ is adjusted along the slide wire resistances $G^1$ and $G^7$ by the operation of a relay motor H shown as having its armature shaft H¹ threaded through the contact G⁶, so that the latter is adjusted longitudinally of the shaft H¹ in one direction or the other according to the direction of rotation of the shaft H¹. The motor H has terminals H² connected to and energized from the amplifier output terminals E² through conductors 6, and has other terminals H³ connected to and energized from the supply conductors 1 and 2 which energize the lamp AA, and, as shown, supply power current to the amplifier terminals E³.

Figure 3:
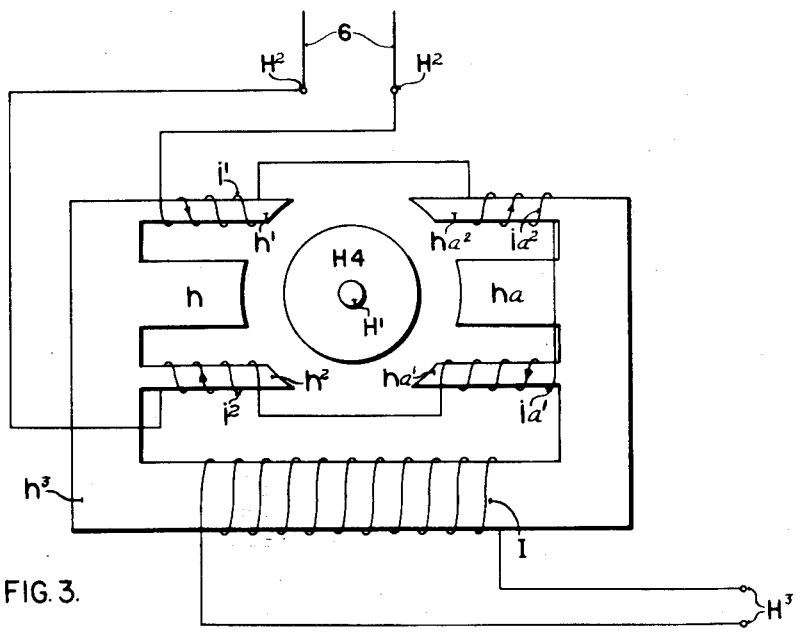
Fig. 3 is a diagrammatic representation of a form of relay motor which may be used in the apparatus shown in Fig. 2.

For its intended use the motor H may be of the form diagrammatically shown in Fig. 3, and comprising a stator core with an opposed pair of main poles h and ha, and with auxiliary poles h' and h² at opposite sides of the pole h, and with auxiliary poles ha' and ha² at opposite sides of the main pole ha. The armature H⁴ of the motor H has a squirrel cage winding and turns within the cylindrical space surrounded by the poles h', h and h², ha', ha, and ha², spaced about the armature in the order stated. The yoke portion h³ of the stator is surrounded by a main winding I connected between the motor terminals H³, and the auxiliary poles h', h², ha' and ha² are surrounded by auxiliary windings or shading coils i', i², ia' and ia² which are connected between the motor terminals H².

The motor H is essentially similar to a two phase induction motor and depends for its operation upon phase displacement of the current flowing in coils h¹, h², ha¹ and ha², collectively and the current flowing in coil I. The inductance of the coil I is large so that the current therein will be approximately 90° out of phase with the voltage across line 1—2. When source AA is energized from the same line, as shown in Fig. 2, the resistance of cell B varies from minimum to maximum as the voltage of the line varies from maximum to minimum in either direction so that whenever current flows in the resistor C³ of the potentiometer circuit it would, if both electrodes of source AA were exposed to cell B, be of a pulsating nature of double the frequency as the line frequency. As previously stated I mask one electrode of cell AA to thereby reduce the frequency of voltage pulsation in resistor C³ to correspond to the frequency in the line.

The amplifier output frequency corresponds, of course, to the frequency in resistor C³ and is approximately in phase therewith so that as a consequence of the inductive phase displacement between the current flow in coil I and the line voltage the amplifier output current will either lag behind or lead, but will be of the same frequency as the current in coil I. Whether the amplifier output current is approximately 90° behind or is approximately 90° in lead of the current in coil I depends upon the direction of current in resistor C³ in response to rise or fall of the voltage of thermo-couple D above or below the value for which resistor G' is then adjusted. With resistor G' balanced for the existing value of the thermo-couple voltage no current will flow in resistor C³ and motor H will be at rest. Upon any variation of the thermo-couple voltage from said existing value, however, a pulsating voltage will be set up in resistor C³ which will be in a direction selectively dependent upon whether the new thermo-couple voltage is more or less than the said value. The amplified pulsations of voltage in resistor C³ will then be impressed upon terminals H² of motor H and the motor will be energized to rotate in one direction or the other according to the direction of phase displacement of the amplifier output from the energizing current for coil I.

As previously indicated the potentiometer instrument shown diagrammatically may follow the approved practice of the art in respect to all of its features other than the mechanism employed to give balancing adjustment movements to the slide wire contact G⁶. For example, the invention is well adapted for use in the well known type of potentiometer known as the "Brown" potentiometer sold and manufactured by the Brown Instrument Company, and the general construction and operation of which is illustrated and described in the application for patent, Ser. No. 546,290, filed June 23, 1931, by Harrison, Grauel and Kessler, and issued March 14, 1939, into Patent 2,150,502. The "Brown" potentiometer as heretofore constructed includes a mechanical relay clutch mechanism, through which a shaft analogous in function to the shaft H' of Fig. 2 is periodically rotated as required for potentiometer rebalancing, and a galvanometer and clutch control mechanism through which the deflection of the galvanometer controls the action of said clutch mechanism. In making use of the present invention, said clutch and clutch control mechanisms and the galvanometer of the "Brown" potentiometer, may be replaced by the motor H and the means shown in Fig. 2 for energizing the terminals of that motor. While the changes referred to do not require modification of major portions of the Brown potentiometer which includes recording apparatus and in many cases control provisions, the changes eliminate relatively expensive and complicated galvanometer and relay clutch mechanism parts and give increased sensitivity both in respect to the small magnitude of the thermo-couple voltage change which can be accurately measured and the quickness of response of the instrument to changes in that voltage. Thus contact G⁶ or other means driven by shaft H' may be arranged to move a recorder pen or indicator across a moving chart or suitable scale to record or indicate the quantity measured.

Figure 4:
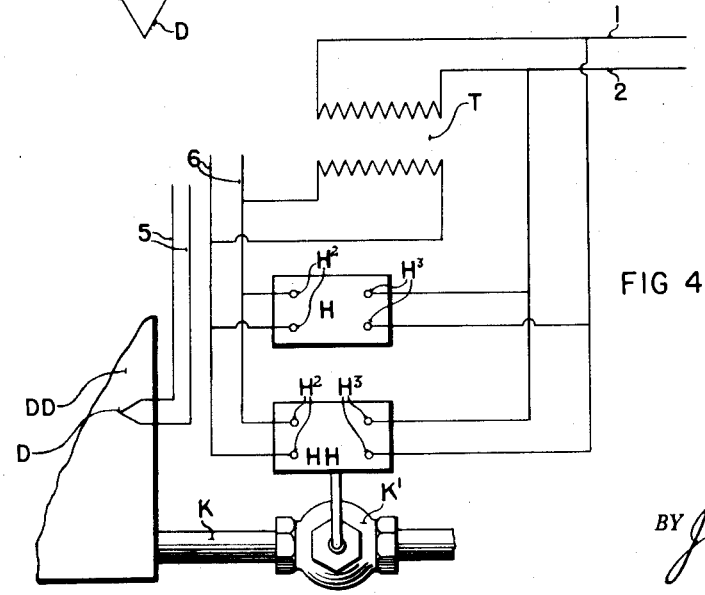
Fig. 4 is a diagrammatic representation of a modification of the arrangement of Fig. 2.

It will be apparent that motor H may be employed to operate a control valve or the like for governing the fuel supply to a furnace, for example, to which thermocouple D is responsive, in lieu of or in addition to operating the shaft H', or another motor, desirably operated together with motor H, may be so employed. For example, as shown in Fig. 4, a furnace DD, to the temperature of which the thermo-couple D responds, is supplied with the fuel, which may be oil, through a supply pipe K at a rate determined by the adjustment of a fuel supply valve K' adjusted by a motor HH. The latter may be exactly like the motor H, and in Fig. 4 is shown as having its terminals H² and H³ connected in parallel with the terminals H² and H³, respectively, of the motor H to the amplifier output terminal 6 and to the supply conductors 1 and 2, respectively. Obviously, however, the motors H and HH may be connected in series instead of in parallel. The mechanical connection of valve K' to motor HH in Fig. 4 is such as to increase and decrease the fuel supply as the temperature to which the thermo-couple D is responsive, drops below or rises above a predetermined normal.

The motor adjusting the fuel valve K' may be operated by or in accordance with the output of the amplifier E of apparatus including the amplifier E and thermo-couple D of Fig. 2, but not including any indicating or recording provisions. As will be apparent, moreover, the fuel control valve, instead of being adjusted through a motor in direct response to the amplifier output, may be controlled indirectly in response to the amplifier output by a potentiometer control instrument, such, for example, as that disclosed in the Harrison Patent No. 1,946,280, granted February 6, 1934, which creates control effects by the deflections of a meter element which deflects from a normal position as the contact $G^6$ of Fig. 2 deflects when the temperature to which the thermocouple D responds varies from a normal value of that temperature.

With the apparatus thus far described, upon a thermocouple or amplifier tube burn out, or other failure of the control apparatus, occurring when the fuel valve adjustment is such as to supply more fuel to the furnace than is thereafter required, the furnace temperature may become excessive, with resultant injury to the furnace and its contents, before the failure is detected and the fuel valve K' manually adjusted to suitably reduce the heat supply to the furnace. To guard against this objectionable possibility, suitable safety means are preferably incorporated in the control apparatus, and in Fig. 4, I have illustrated a desirable form of safety means for the purpose, whereby in case of failure of the control apparatus the motor which directly or indirectly adjusts the fuel valve K' will automatically operate to close that valve. The safety means illustrated in Fig. 4 comprises a transformer T having its primary connected to the supply conductors 1 and 2 and having its secondary so connected between the amplifier output conductors 6 that the motor HH will be energized by the transformer to operate in the direction to give a closing adjustment of the fuel valve K' when the secondary voltage of the transformer T exceeds the voltage of the amplifier output terminals $E^3$.

With the transformer T connected as shown in Fig. 4 between the conductors 6 of such apparatus as is shown in Fig. 2, the relation of the contactor $G^6$ and resistor $G'$ must be so adjusted that with the transformer T out of service the apparatus would tend to maintain the controlled temperature at a value higher than the predetermined value. In consequence, when the thermocouple voltage D is normal and the contactor $G^6$ is in its normal value position, the potentiometer circuit will not be in balance, as in the arrangement shown in Fig. 2, but will be unbalanced, and the unbalance should then be such as to produce an amplifier output voltage equal and opposite to the output or secondary voltage of the transformer T. Then the motors H and HH of Fig. 4 will operate in one direction or the other, or will remain stationary, accordingly, as the temperature of the thermocouple D is above, below or at its normal value, as they do in the arrangement shown in Fig. 2, so long as the thermocouple and amplifier circuits are operative, but, on a failure of the thermocouple or amplifier circuit which deenergizes the amplifier output terminals $E^3$, the motors H and HH of Fig. 4 will operate in the direction required for the closure of the fuel valve I'.

In the use of the invention in the form shown in Fig. 2, it may be desirable to eliminate effects due to stray alternating current voltages which may be impressed on the circuit including the thermocouple D, resistance B and resistance $C^3$ as a result of induction from the potentiometer G, power lines or the like near the apparatus or from other circuit portions not illustrated in Fig. 2, but necessarily included in a potentiometer instrument of commercial form. Such disturbing effects, some, at least, of which have the same frequency as the current amplified in the amplifier E, may be eliminated by the use of suitable filter provisions which may consist of various choke coils and condenser arrangements, and in particular may be avoided by connecting the filter L comprising suitable condensers and impedances connected in the series parallel circuit shown between the circuit conductors 3 and 4 in Fig. 2.

With the arrangement shown in Fig. 2, the potentiometer circuit may be recalibrated from time to time by adjustment of the resistance $G^5$ in said circuit as required to maintain the current flow through the resistor $G^1$ approximately constant notwithstanding variations in the voltage of the battery $G^4$ or other changes in conditions. To facilitate such recalibrating operations, the switch $G^8$ may be shifted into its dotted line position in which the thermocouple D is open circuited and the light sensitive resistance B is connected in series with a standard cell $G^9$ and a suitable resistance $G^{10}$ in shunt with the resistance $G^3$. With the resistance $G^3$ and $G^{10}$ suitably proportioned relative to other elements of the potentiometer circuit, the latter may then be properly recalibrated by adjustment of the resistance $G^5$ as may be required to eliminate current flow through the light sensitive resistance B when the contact $G^6$ occupies a predetermined position in which it is then maintained by the apparatus as a result of the fact that the potential drop through the resistance $G^3$ is then equal and opposite to the electromotive force of the standard cell $G^9$.

The contactor $g^6$ may be adjusted along the resistor $G^5$ to recalibrate the energizing circuit of the potentiometer manually, or automatically as by operatively connecting it to the motor H during the recalibration periods. Advantageously, however, the instrument may include a special recalibrating motor HB which may be similar in principle to the motor H and which has its terminals $H^3$ connected to the power line conductors 1 and 2, and which has its terminals $H^2$ connected to the amplifier output terminals 6 throughout each recalibration period. In the arrangement diagrammatically shown in Fig. 2, a switch J is provided to disconnect the terminals $H^2$ of the motor H from the conductor 6 and connect the latter to the terminals $H^2$ of the motor HB at the beginning of each calibration period and to restore the original condition in which the motor HB is disconnected from, and the motor H is connected to the conductors 6 at the end of each recalibration period. The switches J and $G^8$ may advantageously be connected for simultaneous operation. As shown diagrammatically in Fig. 2, they are so connected by means of a link J' connecting the lever $G^8$ to one arm of a bell crank lever $J^2$ pivoted at $J^3$ and having its second arm connected by a link $J^4$ to the switch J. As shown in Fig. 2, the shaft $H^{10}$ of the motor HB has a threaded portion passing through a threaded aperture in the carrier for the contactor $g^6$ so that the rotation of the motor shaft $H^{10}$ in one direction or the other will move the contact $g^6$ in one direction or the other along the resistance $G^5$.

Means may be provided for periodically actuating switches G and J at suitably frequent intervals. For example, when, as is usual in a recording instrument the latter includes a constantly operating timing motor for advancing the record chart, the timing motor may oscillate the lever $J^2$ through a suitable cam means but no such means are illustrated or need to be described herein as they form no part of the invention claimed herein.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. The combination with a source of small unidirectional electromotive force, of potentiometer measuring means to which said source is connected and comprising an alternating current motor reversibly rotatable to adjust said means as required to create a potential difference therein normally balancing said electromotive force, said motor comprising a main field winding and shading field windings and rotating when alternating currents flow through said windings in a direction depending on the phase relation of said currents, means for causing current flowing through said source to pulsate, means continuously connected to the terminals of said shading field windings and energized by the pulsating current to deliver alternating current displaced in phase from said current flow in one direction or the other accordingly as the direction of flow of said pulsating current is in one direction or the other to said shading field windings and separate means continuously connected to the terminals of said main field winding for supplying alternating current to the said main field winding.

2. The combination with a source of small unidirectional electromotive force, of potentiometer measuring means to which said source is connected and comprising an electric motor reversibly rotatable to adjust said means as required to create a potential difference therein normally balancing said electromotive force, said motor comprising a main field winding and shading field windings and rotating when alternating currents flow through said windings in a direction depending on the phase relation of said currents, means including alternating supply means for causing current flow through said source to pulsate, and amplifying means continuously connected to the terminals of said shading field windings and energized by the pulsating current to deliver alternating current displaced in phase from said current flow in one direction or the other accordingly as the direction of flow of said pulsating current is in one direction or the other to said shading field windings, the main field winding having its terminals continuously connected to said alternating current supply means and receiving energizing current therefrom.

3. In a system for producing control effects in accordance with the value of a control condition, a single device responsive to said condition and adapted to produce an electrical current of one polarity or of opposite polarity depending upon the value of said condition, a reversible electric control motor adapted to operate under control of said electrical current in one direction or the other depending on the value of said condition and means adapted to operate said motor in one of said directions upon termination of the control of said motor by said device.

4. In a control system for a process having an inoperative condition and having an operative condition maintained by the application of a control agent, a reversible electric motor creating control effects by its operation in accordance with its direction of operation to thereby control the application of said agent, energizing means external of said motor and independent of said condition constantly tending to energize said motor for operation in a direction to prevent application of said agent and adjust said process to its inoperative condition, and means normally responsive to a control condititon for subjecting said motor to an energizing effect tending to rotate said motor in the opposite direction.

5. In a system for a process having an inoperative condition and having an operative condition maintained by the application of a control agent normally operative to produce control effects in accordance with the value of a variable control condition to thereby control the application of said agent, a reversible electric control motor, electrical energizing means external of said motor and independent of said condition for subjecting said motor to an energizing effect operating the motor in a direction to prevent the application of said agent and adjust said process to its inoperative condition, and means normally operative in response to said condition, for wholly or partially neutralizing said effect, or for subjecting the motor to an energizing effect operating the motor in the reverse direction accordingly as the value of said condition is at, or at one side or the other of a predetermined value of said condition.

6. In a system for controlling a temperature a reversible electric motor controlling the heat supplied to maintain said temperature, energizing means external to said motor constantly tending to operate the motor in the direction to reduce said heat supply and means responsive to said temperature for subjecting said motor to an energizing effect which tends to operate the motor in the direction to increase the heat supply and which increases and decreases as said temperature decreases and increases, whereby said motor will operate in one direction or the other or will remain stationary accordingly as said temperature is above, below, or at a predetermined value when said last mentioned means is operative, and when it becomes inoperative, said motor will operate in the first mentioned direction.

7. In a temperature control system normally operating to maintain a controlled temperature at a predetermined value, means for creating an electromotive force which increases in magnitude as the controlled temperature diminishes below a temperature higher than said predetermined value, a reversible electric motor tending to increase and decrease said temperature according to its direction of operation, and means for subjecting said motor to an energizing effect which is the resultant of the first mentioned electromotive force and an opposing constant electromotive force equal to the first mentioned force when said temperature is at said predetermined value, said motor operating in the direction to increase or decrease the controlled temperature accordingly as the first mentioned force exceeds or is less than said opposing force.

8. In a temperature control system, a heat supply regulator having a normal position, a forward position, and a reverse position, and regulator controlling means, including a reversible electric motor and a thermionic discharge device controlling said motor through which said regulator is normally operated to increase and decrease said supply in accordance with variations in a control temperature, and including means operative upon failure of said device to operate said regulator to decrease the heat supply.

9. In a system for controlling a variable condition, a condition regulator having a normal position, a forward position, and a reverse position, and regulator controlling means, including a reversible electric motor and thermionic means controlling said motor, normally operating said regulator to vary said condition in accordance with its value, and means operative upon failure of said thermionic means to operate said regulator independently of the value of said condition.

10. Electrical apparatus for measuring a variable condition, comprising a source of uni-directional electromotive force the magnitude of which is controlled by said condition, an electrical circuit electrically connected with said source including a relatively fixed resistor, a variable resistor for causing said electromotive force to produce a pulsating current flow of predetermined frequency in said circuit, means associated with said fixed resistor for amplifying pulsating current flow through the latter and filter means in said circuit for rendering extraneous currents substantially non-pulsating in said resistors.

11. Electrical apparatus for measuring a variable condition comprising a source of uni-directional electromotive force the magnitude of which is controlled by said condition, an electrical circuit electrically connected with said source including a relatively fixed resistor, a variable light sensitive resistor for causing said electromotive force to produce a pulsating current flow of predetermined frequency in said circuit, means for transmitting light regularly varying in intensity to said light sensitive resistor, means associated with said fixed resistor for amplifying the pulsating potential drop in the latter and filter means in said circuit for rendering extraneously produced currents substantially non-pulsating in said resistors.

12. The combination with a furnace and responsive element therein of electrical temperature measuring apparatus comprising a source of uni-directional electromotive force the magnitude of which is controlled in accordance with the temperature of said furnace, an electrical circuit electrically connected with said source including a relatively fixed resistor, a variable resistor for causing said electromotive force to produce a pulsating current flow of predetermined frequency in said circuit, means associated with said fixed resistor for amplifying the potential drop in the latter and filter means shunted about said resistors for opposing current flow therethrough due to electromotive forces extraneously induced in said circuit.

13. The combination with a furnace and responsive element therein of electrical temperature measuring apparatus comprising a source of uni-directional electromotive force the magnitude of which is controlled in accordance with the temperature of said furnace, an electrical circuit electrically connected with said source including a relatively fixed resistor and a light sensitive variable resistor for causing said electromotive force to pulsate with a predetermined frequency, means associated with said fixed resistor for amplifying the potential drop in the latter and filter means shunted about said resistor for opposing current flow therethrough due to electromotive forces extraneously induced in said circuit.

14. Apparatus for measuring a variable condition comprising means for producing a uni-directional electromotive force of a magnitude varying with the magnitude of said condition, and cooperating electrical apparatus electrically connected with said means energized by said force to create pulsating electrical currents of predetermined frequency and filter means electrically connected between said means and said apparatus to eliminate the effect of extraneously induced currents in said apparatus of the same frequency as the first mentioned currents.

15. Apparatus for measuring a variable condition including means for producing a uni-directional electromotive force of magnitude varying with the magnitude of said condition, an electrical measuring circuit on which said electromotive force is conductively applied including an impedance, means for causing said electromotive force to produce a pulsating current flow of predetermined frequency through said impedance, means associated with said impedance for amplifying pulsating current flows through the latter, and a condenser connected in said electrical measuring circuit to render currents extraneously induced in said electrical measuring circuit including currents of the same frequency it is desired to amplify substantially non-pulsating in said impedance.

16. The combination of claim 15 in which said second mentioned means includes a variable impedance and means to vary said impedance at a regular frequency.

17. The combination of claim 15 and additional impedance means electrically associated with said condenser.

18. Apparatus for measuring a variable condition including means for producing a unidirectional electromotive force of magnitude varying with the magnitude of said condition, current responsive means to indicate the magnitude of said electromotive force and including means for causing said electromotive force to produce a pulsating current flow of predetermined frequency and for amplifying said pulsating current, a connection for applying said electromotive force to said current responsive means, and a condenser included in said connection to render currents extraneously induced in said connection including currents of said predetermined frequency ineffective to affect the indication of said current responsive means.

19. The combination of claim 18 wherein said connection also includes an impedance.

20. In combination with an alternating current motor comprising a stator and a rotor and two sets of shading coils, means for causing the electromotive forces induced in one set of shading coils to oppose the electromotive forces induced in the other set of shading coils whereby the rotor is stationary, and means comprising an amplifier electrically associated to said shading coils for assisting the electromotive forces induced in one of said sets of shading coils and for opposing and overcoming the electromotive forces induced in the other of said sets of shading coils to cause rotation of the rotor in either desired direction.

21. In combination with an alternating current motor comprising a stator and a rotor and two sets of shading coils, means for causing one set of shading coils to oppose the other set in electrical effect whereby the rotor is stationary, a control element, a second control element remotely located therefrom, means comprising a normally balanced electrical circuit extending from one of said control elements to the other, and means responsive to unbalance of said circuit for operating said first control element to restore said balance, said last mentioned means including means for applying to said shading coils electromotive force which assists the electromotive forces induced in one of said sets of shading coils and which opposes the electromotive forces induced in the other of said sets of shading coils, to cause rotation of the rotor in either desired direction.

22. In combination with an alternating current motor comprising a stator and a rotor and two shading coils, means for preventing the shading coils from causing rotation of the rotor, said means including means for causing one of said shading coils to oppose the other of said shading coils in electrical effect, a control element, a second control element remotely located therefrom, means comprising a normally balanced electrical circuit extending from one of said control elements to the other, and means responsive to unbalance of said circuit for operating said first control element to restore said balance, said last mentioned means including means for applying to said shading coils electromotive force which assists the electromotive force induced in one of the said shading coils and which opposes the electromotive force induced in the other of said shading coils, to produce torque upon the rotor in either desired direction.

23. In combination with an alternating current motor comprising a stator and a rotor and two shading coils, means for preventing the shading coils from causing rotation of the rotor, said means including means for causing one of said shading coils to oppose the other of said shading coils in electrical effect, and means comprising an amplifier electrically associated to said shading coils for applying to said shading coils electromotive force which assists the electromotive force induced in one of said shading coils and which opposes the electromotive force induced in the other of said shading coils, to produce torque upon the rotor in either desired direction.

24. In combination with an alternating current motor comprising a stator and a rotor and two shading coils, means for preventing the shading coils from causing rotation of the rotor, said means including means for causing one of said shading coils to oppose the other of said shading coils in electrical effect, a control element, a second control element remotely separated from the first control element, and adapted to be operated by said motor, a normally balanced electrical circuit extending between said control elements, and means including an amplifier responsive to unbalance of said circuit, for causing said motor to operate the second control element to restore the balance of said circuit, said last mentioned means including means energized by the amplifier for assisting the electromotive force induced in one of the said shading coils and for opposing and overcoming the electromotive force induced in the other of said shading coils, to produce torque upon the rotor in either desired direction.

25. The combination of claim 24 wherein the means for causing one shading coil to oppose the other shading coil is adapted to prevent flow of current in said shading coils and includes means for causing the electromotive force induced in one of said shading coils to oppose the electromotive force induced in the other of said shading coils.

26. In combination, a controlling element variable in condition, a controlled element variable in condition, means controlled by the relative condition of said elements for creating variations in electrical potential, an amplifier controlled by the variations in potential produced by said first mentioned means, and an alternating current motor having shading coils supplied with energy produced by said amplifier, for adjusting said controlled element.

27. The combination with a potentiometer measuring circuit including a source of electromotive force to be measured, a second source of electromotive force, means including a resistor to oppose said electromotive forces to derive a differential electromotive force, means to cause the differential current produced in said resistor by said differential electromotive force to fluctuate, means to amplify said fluctuating current, said resistor adapted to be automatically adjusted under control of said amplified fluctuating current to balance said second source against said first mentioned source during normal measuring periods, a calibrating resistor adapted to be adjusted during recalibrating periods alternating with said measuring periods to compensate for changes in the magnitude of said second source, of automatic means for adjusting said calibrating resistor continuously during said recalibrating period until the recalibrating adjustment is completed, said automatic means adapted to be controlled by said amplifying means.

28. The combination of claim 27 wherein said automatic means for adjusting said calibrating resistor comprises a reversible electric motor mechanically connected to said recalibrating resistor and operating continuously during each recalibrating period until the recalibrating adjustment is completed.

29. The combination with a potentiometer measuring circuit including a source of electromotive force to be measured, a second source of electromotive force, means including a resistor to oppose said electromotive forces to derive a differential electromotive force, means to cause the differential current established in said resistor by said differential electromotive force to fluctuate, means to amplify said fluctuating current, a reversible electrical motor controlled by said amplified fluctuating current for automatically adjusting said resistor to balance said second source against the first mentioned source during normal measuring periods, a recalibrating resistor adjustable to compensate for variations in magnitude of said second source, and automatic means including a second reversible electrical motor adapted to be controlled by said amplifying means for adjusting said second resistor continuously until the recalibrating adjustment is completed during calibrating periods alternating with said normal measuring periods.

30. Apparatus for measuring a variable condition including means for producing a unidirectional electromotive force of magnitude varying with the magnitude of said condition, an electrical measuring circuit including an impedance on which said electromotive force is conductively applied, means for causing said electromotive force to produce a pulsating current flow of predetermined frequency through said impedance, a capacitive reactance connected between said first mentioned means and said electrical circuit to render currents extraneously induced in said measuring circuit including currents of said predetermined frequency substantially non-pulsating in said impedance, and means associated with said impedance for amplifying pulsating current flows through the latter.

31. Apparatus for measuring a variable condition including means for producing a unidirectional E. M. F. of magnitude varying with the magnitude of said condition, current responsive means to indicate the magnitude of said electromotive force and including means for causing said electromotive force to produce a pulsating current flow of predetermined frequency and for amplifying said pulsating current, a connection between said first mentioned means and said current responsive means to apply said electromotive force to said current responsive means, and electrical reactance means connected in said connection in series with said first and second mentioned means to render currents extraneously induced in said connection including currents of said predetermined frequency ineffective to affect the indication of said current responsive means.

32. The combination of claim 31 and capacitive reactance means associated with said electrical reactance means.

33. The combination of claim 31 wherein said electrical reactance means includes an inductive reactance.

HENRY M. SCHMITT.